United States Patent [19]

Wakabayashi

[11] Patent Number: 5,459,540
[45] Date of Patent: Oct. 17, 1995

[54] CAMERA WITH MAGNETIC HEAD IN CONTACT WITH FILM DURING PRE-WIND

[75] Inventor: Tsutomu Wakabayashi, Yokohama, Japan

[73] Assignee: Nikon Corporation, Tokyo, Japan

[21] Appl. No.: 380,446

[22] Filed: Jan. 30, 1995

Related U.S. Application Data

[63] Continuation of Ser. No. 299,333, Aug. 31, 1994, abandoned, which is a continuation of Ser. No. 177,190, Jan. 3, 1994, abandoned, which is a continuation of Ser. No. 66,647, May 25, 1993, abandoned, which is a continuation of Ser. No. 721,254, Jun. 26, 1991, abandoned.

[30] Foreign Application Priority Data

Jun. 29, 1990 [JP] Japan .................................. 2-172404

[51] Int. Cl.$^6$ .................................................. G03B 17/24
[52] U.S. Cl. ............................................................ 354/105
[58] Field of Search ........................................ 354/105, 106, 354/76

[56] References Cited

U.S. PATENT DOCUMENTS

| | | | |
|---|---|---|---|
| 4,642,717 | 2/1987 | Matsuda et al. ........................ | 360/105 |
| 4,832,275 | 5/1989 | Robertson ............................. | 242/71.1 |
| 4,860,037 | 8/1989 | Harvey ................................. | 354/105 X |
| 4,996,546 | 2/1991 | Pagano et al. ......................... | 384/76 |
| 5,016,030 | 5/1991 | Dwyer et al. .......................... | 354/21 |

FOREIGN PATENT DOCUMENTS

| | | | |
|---|---|---|---|
| 0362892 | 4/1990 | European Pat. Off. . | |
| 435277A2 | 3/1991 | European Pat. Off. ............... | 354/105 |
| 0433019 | 6/1991 | European Pat. Off. . | |

Primary Examiner—Russell E. Adams
Assistant Examiner—J. K. Han
Attorney, Agent, or Firm—Shapiro and Shapiro

[57] ABSTRACT

A camera, capable of loading a cartridge housing a film which is provided with image recording areas and a magnetic recording area in which plural sets of a same magnetically recorded information are consecutively recorded along the longitudinal direction, is provided with a film feeding device for effecting a pre-winding operation for winding the film in the loaded cartridge to the end onto a winding spool prior to the photo-taking operations; a magnetic head capable of being contacted with or separated from the magnetic recording area of the film and reading the magnetically recorded information in the contacted state; a contact/separating mechanism for contacting or separating the magnetic head with or from the magnetic recording area of the film; and controller for controlling the contact/separating mechanism so as to contact the magnetic head with the magnetic recording area, in the course of the pre-winding operation, for a period which is shorter than the time required from the start to the end of the pre-winding operation but is enough for reading at least a set of the magnetically recorded information.

16 Claims, 16 Drawing Sheets

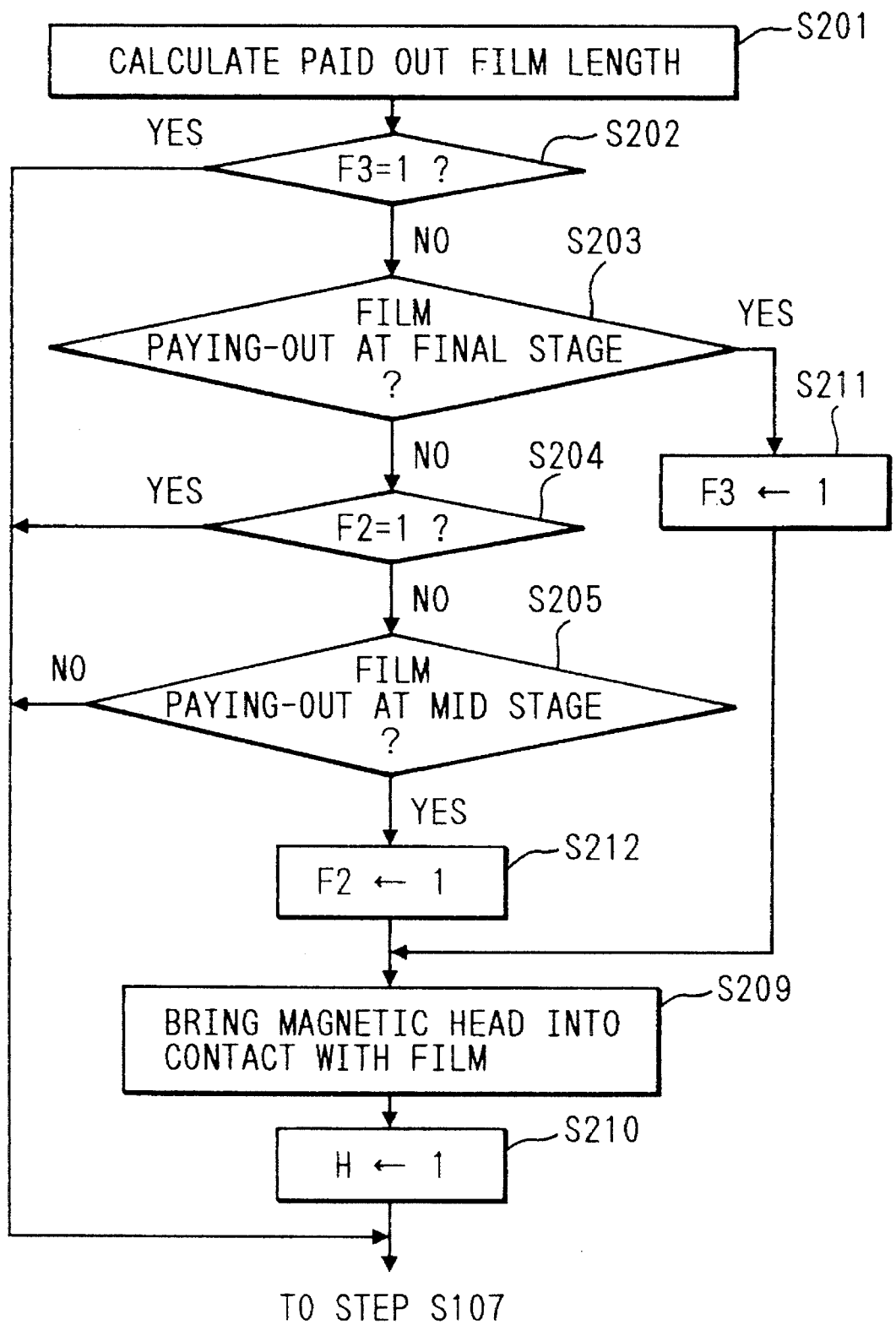

:::::::::::::

CAMERA WITH MAGNETIC HEAD IN CONTACT WITH FILM DURING PRE-WIND

This is a continuation of application Ser. No. 08/299,333 filed Aug. 31, 1994, which is a continuation of application Ser. No. 08/177,190 filed Jan. 3, 1994, which is a continuation of application Ser. No. 08/066,647 filed May 25, 1993, which is a continuation of application Ser. No. 07/721,254 filed Jun. 26, 1991, all now abandoned.

BACKGROUND OF THE INVENTION

1. Field of the Invention

The present invention relates to a camera equipped with a magnetic head for reading magnetically recorded information from a magnetic recording area of a photographic film.

2. Related Background Art

The U.S. Pat. No. 4,860,037 discloses a technology of providing a magnetic member as a magnetic recording area on a photographic film, magnetically recording various information (such as film sensitivity, number of image frames etc.) on said magnetic member, and reading said recorded information when said film is loaded in a camera. Said camera is equipped with a magnetic head which can be brought into contact with the magnetic recording area of said film, and reads the information by contacting said magnetic head with the magnetic recording area in the course of feeding of said film.

On the other hand, there is already known a camera capable of so-called pre-winding operation, in which the film housed in a film cartridge is all taken up on a film winding spool prior to the photo-taking operations, and is then rewound into said film cartridge by one frame at each phototaking operation. In case the above-mentioned magnetic head is provided in such camera, the information reading may be conducted at the pre-winding operation explained above.

The above-mentioned magnetic recording area is provided along the longitudinal direction of the film, and the magnetically recorded information, composed for example of the film sensitivity, number of image frames, film latitude etc. as a set, is usually recorded in consecutive plural sets, in order to enable secure information fetching by repeating the reading operation even if the information reading failed at a film feeding.

However, in such camera conducting the pre-winding operation, if the magnetic head is maintained in contact with the magnetic recording area of the film from the start to the end of said pre-winding operation, the magnetic head is abraded severely and the service life thereof becomes significantly shortened.

SUMMARY OF THE INVENTION

The object of the present invention is to provide a camera designed to effect pre-winding operation and provided with a magnetic head, capable of securely reading necessary magnetically recorded information and minimizing the abrasion of the magnetic head.

The present invention is applicable to a camera capable of loading a film cartridge which houses a film having image recording areas and a magnetic recording area in which plural sets of same magnetically recorded information are consecutively recorded along the longitudinal direction. Said camera is provided with film feeding means for effecting a pre-winding operation for winding the film in said loaded film cartridge to the end of said film on a winding spool prior to the phototaking operations; a magnetic head which can be contacted with or separated from the magnetic recording area of the film and reads said magnetically recorded information in the contacted state; contact/separating means for contacting or separating said magnetic head with or from the magnetic recording area; and control means for controlling said contact/separating means in such a manner as to contact the magnetic head with the magnetic recording area, in said pre-winding operation, for a period which is shorter than the time required from the start to the end of said pre-winding operation but is at least enough for reading a set of the magnetically recorded information.

In the pre-winding operation, the control means so controls the contact/separating means as to contact the magnetic head with the magnetic recording area of the area for predetermined period, which is shorter than the time required from the start to the end of said prewinding operation but is enough for reading at least a set of recorded information, whereby a set of information can be securely read with minimized abrasion of the magnetic head.

BRIEF DESCRIPTION OF THE DRAWINGS

FIGS. 1 to 11 illustrate an embodiment of the present invention, wherein:

FIG. 1 is a block diagram of a control system of the camera of the present invention, equipped with a magnetic head;

FIGS. 2 and 3 are perspective views showing principal parts of said camera;

FIG. 5 is a view showing the film structure;

FIG. 6 is a flow chart of a main control program;

FIGS. 7 to 11 are flow charts of subroutine programs;

FIGS. 13 to 17 are flow charts respectively showing variations thereof.

DESCRIPTION OF THE PREFERRED EMBODIMENTS

Figure 1:
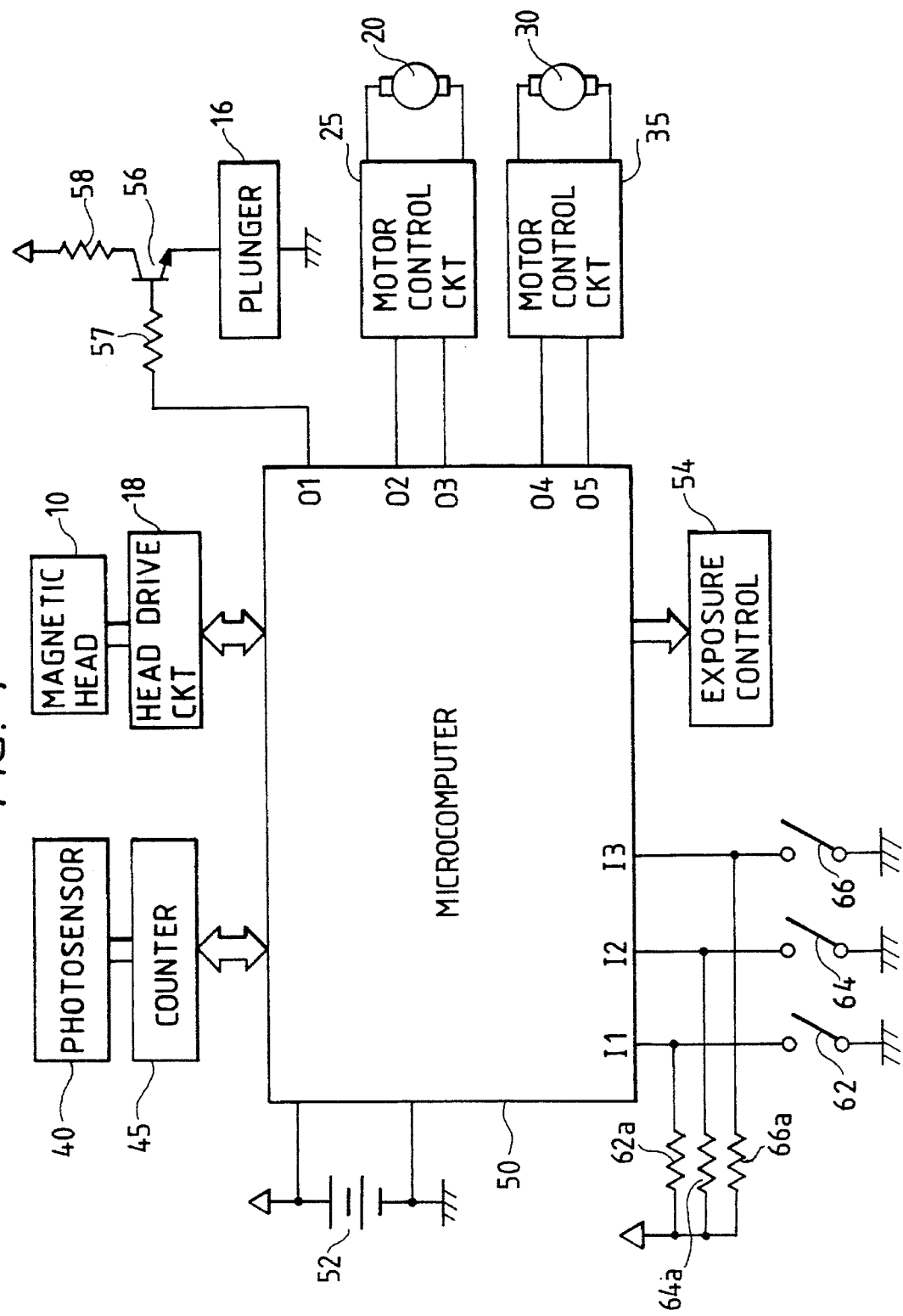
Figure 2:
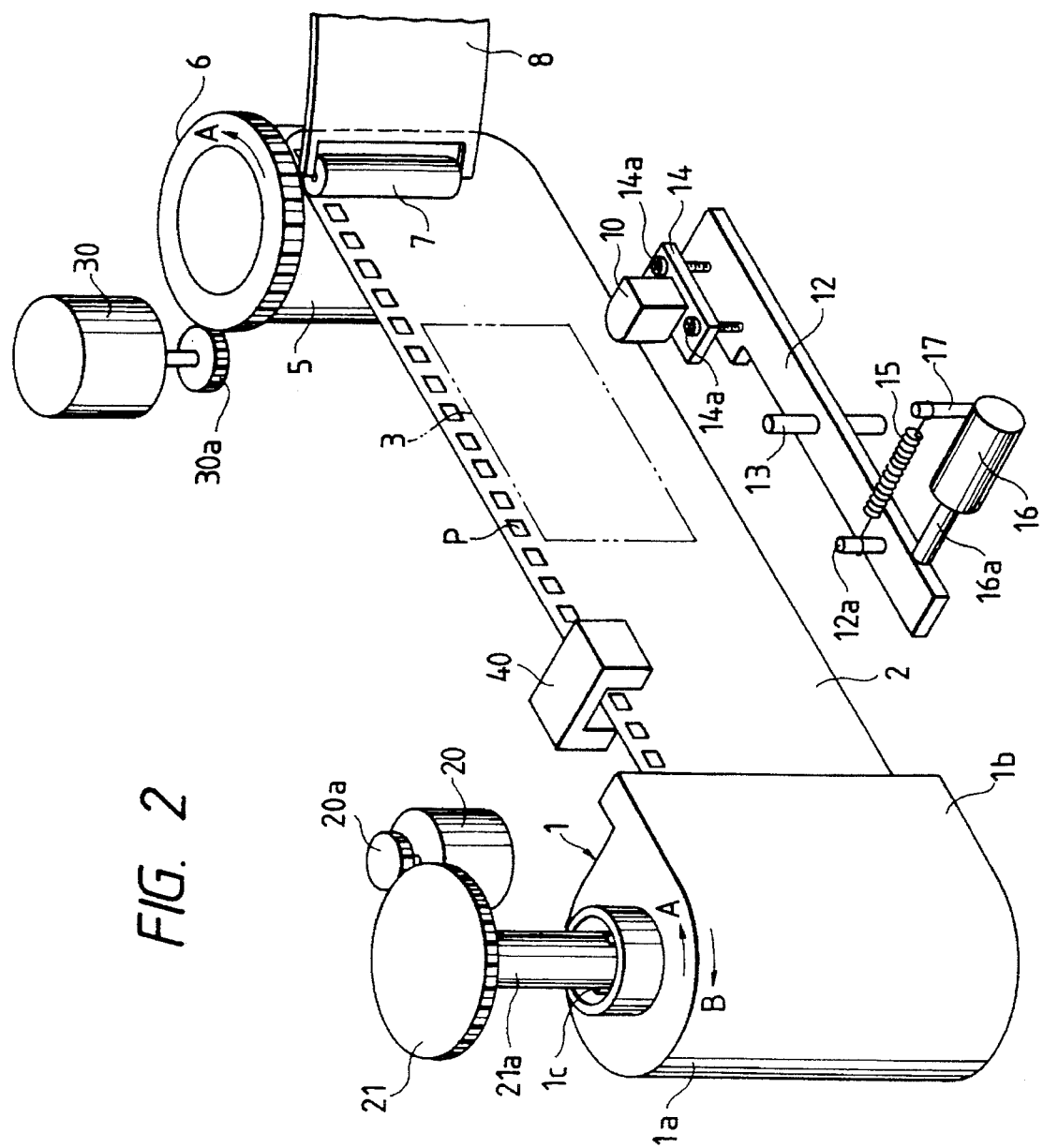
Figure 3:
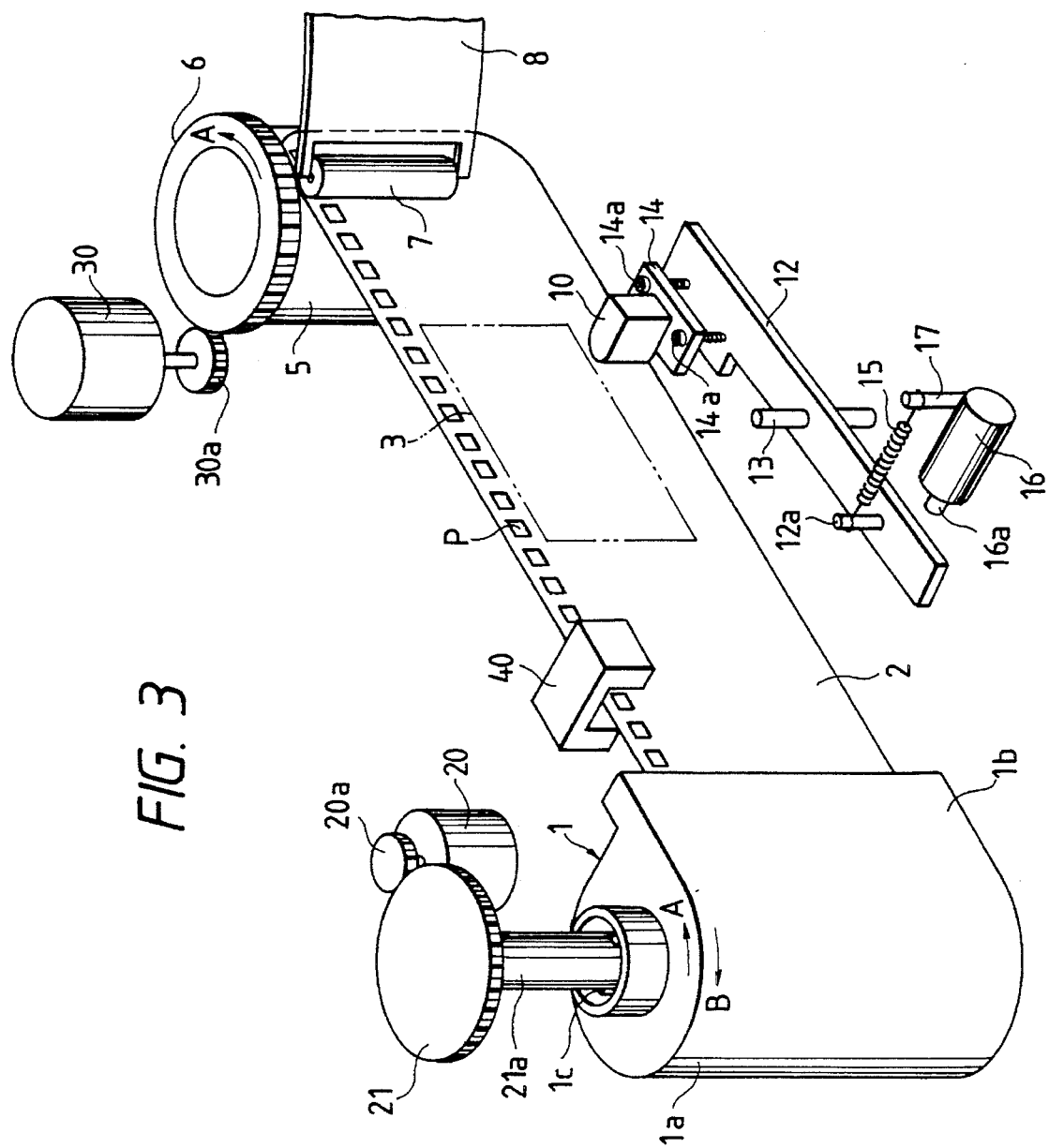
Figure 4A:
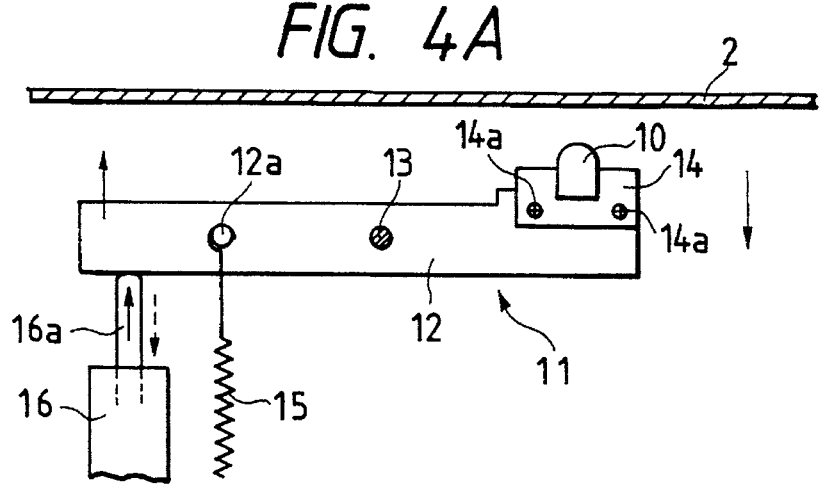
FIGS. 4A and 4B are plan views thereof.
Figure 4B:
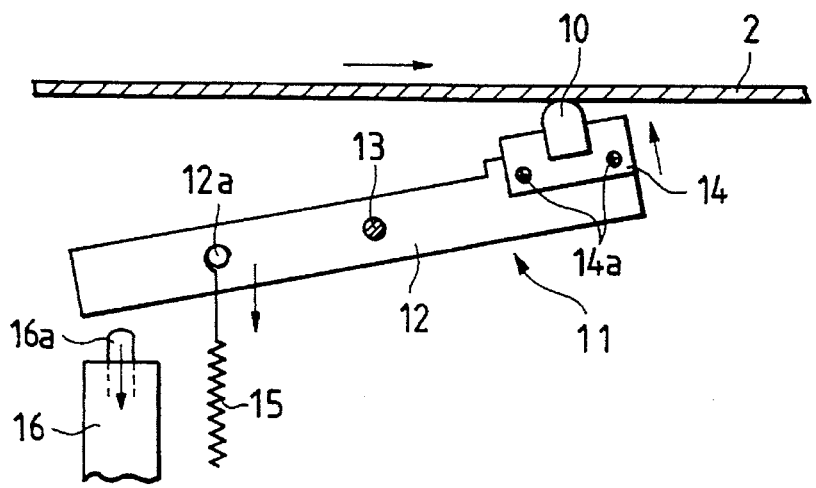

Now the present invention will be clarified in greater detail by an embodiment hereof shown in FIGS. 1 to 11, wherein FIGS. 2 and 3 are perspective views showing principal parts of a camera embodying the present invention, and FIGS. 4A and 4B are plan views thereof.

A film cartridge 1 is composed of a cylindrical portion 1a and a lip portion 1b tangentially and integrally connected thereto. A film 2 is housed in said cartridge in a state wound on an unrepresented spool provided in said cylindrical portion 1a, and the leading end portion of said film is positioned in a linear state in said lip portion 1b. The film 2 is advanced from a slit at the end of said lip portion 1b by externally rotating said spool in a direction A, and is rewound into the cartridge 1 by rotating said spool in a direction B. Such cartridge 1 is disclosed for example in the U.S. Pat. No. 4,832,275.

Said cartridge 1 is loaded in an end portion of a camera body, and the film 2 extracted from said cartridge passes through an unrepresented film path and behind an aperture 3, and the leading end of said film 2 is wound on a film winding spool 5 positioned at the other end portion of the camera body.

Figure 5:
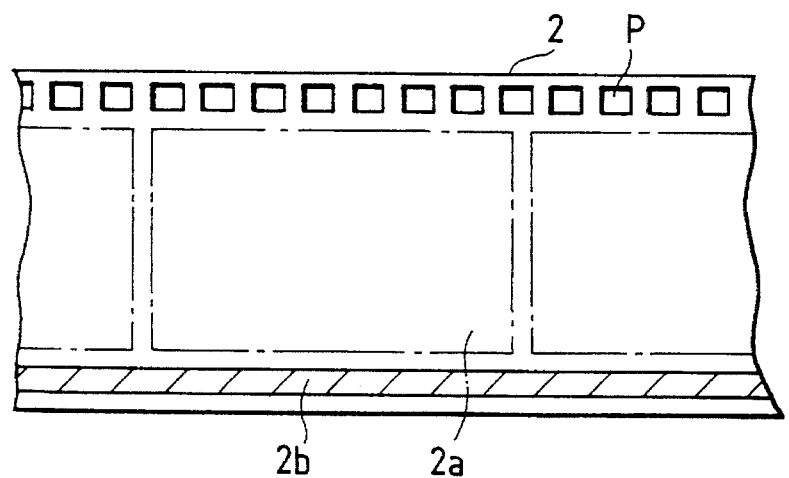

The film 2 of the present embodiment is provided, as shown in FIG. 5, with an image recording area 2a in which optical (image) information is recorded by a phototaking operation, and a magnetic recording area 2b positioned thereunder and extending in the longitudinal direction. In said magnetic recording area 2b, there are in advance recorded information specific to the film, such as the information on the ISO sensitivity and number of available image frames, information on the kind of the film 2 (such as negative or reversal film, color or black-and-white film), and information on the film latitude.

Such information, on ISO sensitivity, number of image frames, kind of film, latitude etc. formed as a set, is recorded in plural times in consecutive manner on the area 2b, in order to enable secure information fetching by repeating the reading operation even if a reading operation fails, as explained above. Also information indicating the start and the end of a set are respectively recorded at the start and the end of a set of information.

The film 2 is further provided with perforations P in the conventional manner. Said perforations P are used, in the present embodiment, for detecting the amount of film advancement by a photosensor 40 to be explained later, but they may also be utilized for feeding the film.

Referring to FIG. 2, a film pressing roller 7 rotatable along the external periphery of said film winding spool 5 is supported by a support plate 8 and biased toward the periphery of said winding spool 5 by means of an unrepresented spring. A magnetic head 10, for reading the information recorded in the magnetic recording area 2b of the film 2 or recording information in said area 2b, is so positioned as to be contacted with said recording area 2b of the film 2.

Said magnetic head 10 is mounted, by a bracket 14 and screws 14a, to a support level 12, and can be adjusted in inclination by said screws 14a. Said support lever 12 is rendered rotatable about a shaft 13 fixed in the camera body, and is biased anticlockwise in the drawing, namely in a direction to press the magnetic head 10 to the film surface, by means of a spring 15 which is mounted between a pin 12a fixed on the other end of said support lever 12 and a pin 17 fixed in the camera body.

In a plunger 16, consisting of a magnetic solenoid having an engaging rod 16a, in the deactivated state thereof, the engaging rod 16a protrudes as shown in FIG. 2 or 4A by the biasing force of an internal spring (not shown), whereby the support lever 2 is maintained in the illustrated position against the biasing force of the spring 15, and the magnetic head is separated from the magnetic recording area 2b of the film 2. When the plunger 16 is energized, an internal iron core is attracted to retract the engaging rod 16a as shown in FIG. 3 or 4B, whereby the lever 12 rotates anticlockwise by the biasing force of the spring 15 to contact the magnetic head 10 with the magnetic recording area 2b of the film 2, thereby enabling information reading and recording by the magnetic head 10.

A pressure pad composed of a felt-like material is positioned opposite to the magnetic head and across the film 2, so that, when the magnetic head 10 is brought into contact with the film 2, it is sandwiched between said magnetic head 10 and the pressure pad with a predetermined pressure, whereby the information reading or recording can be conducted in appropriate manner.

A film advancing and winding motor 20 is provided, on the shaft thereof, with a gear 20a meshing with a film driving gear 21 having an integral key, which can engage with a spline 1c formed at the upper end of the spool shaft of the cartridge 1. A spool attaching and prewinding motor 30 is provided, on the shaft thereof, with a gear 30a meshing with a gear 6 formed on the upper part of the winding spool 5. A photosensor 40, having a light-emitting element and a light-receiving element (both not shown) positioned across the perforated part of the film 2, optically detects the passing of the perforations P in the course of film advancement, and results of said detection after photoelectric conversion, wave form shaping and amplification.

FIG. 1 is a block diagram of a control system of the camera explained above.

A microcomputer 50, powered by a battery 52, is connected to a cartridge detecting switch 62, a cartridge lid detecting switch 64, and a shutter release switch 66. Said cartridge detecting switch 62 is turned on or off respectively when said cartridge 1 is loaded in the camera or taken out therefrom. The cartridge lid detecting switch 64 is turned on or off respectively when a cartridge lid (a cover of the cartridge loading chamber) of the camera is closed or opened. The shutter release switch 66 is turned on in linkage with the depression of the unrepresented shutter releasing button. The closing of said switch 66 identifies a shutter releasing operation and effects a phototaking operation. Said switches are connected respectively at an end thereof to input ports I1, I2, I3 of the microcomputer 50 and to the power source through resistors 62a, 64a, 66a, and are grounded at the other end.

Motor control circuits 25, 35 for the above-mentioned motors 20, 30 are respectively connected to output ports 02, 03, 04, 05 of the microcomputer 50. The motor 20 is rotated in the forward direction (film forwarding direction) or in the reverse direction (film rewinding direction) respectively when an output port 02 or 03 alone is in the high level state, and is stopped by braking action when both ports are in the high level state. Similarly the motor 30 is rotated in the forward direction (film forwarding direction) or in the reverse direction (film rewinding direction) respectively when an output port 04 or 05 alone is in the high level state, and is stopped by braking action when both ports are in the high level state.

A magnetic head driving circuit 18 drives the magnetic head 10 for recording information on the magnetic recording area 2b of the film 2 or reading the information recorded in said area 2b. An exposure control device 50 is composed for example of a shutter, a diaphragm, a diaphragm control device etc. and effects a phototaking operation by controlling the diaphragm and the shutter at a predetermined aperture and a predetermined shutter speed in response to an instruction from the microcomputer 50. A counter 45 counts the output signals of said photosensor 40 and sends the obtained count to the microcomputer 50, and is reset to zero by an instruction from the microcomputer 50.

An output port 01 of the microcomputer 50 is connected through a resistor 57 to the base of a transistor 56, of which collector is connected through a resistor 58 to the battery 52 and emitter is connected to the plunger 16. When the output port 01 is shifted to the high or low level state, the transistor 56 is respectively turned on or off to energize or deactivate the plunger 16.

Figure 6:
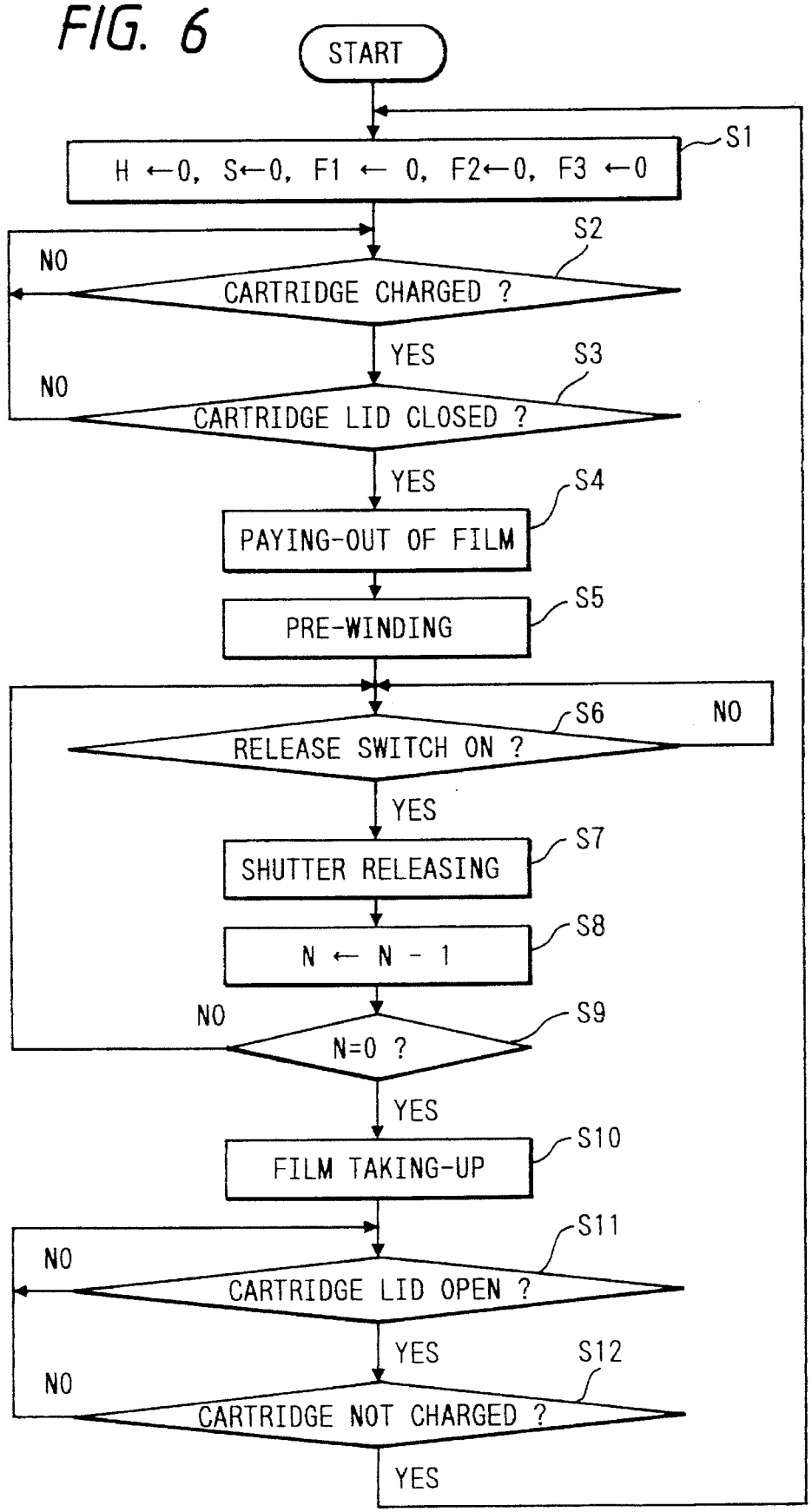

In the following there will be explained the control sequence of the microcomputer 50, with reference to flow charts shown in FIGS. 6 to 11, in which FIG. 6 shows the control sequence of a main program, while FIGS. 7 to 11 show the control sequences of subroutine programs.

The main program shown in FIG. 6 is activated when the battery 52 is loaded in the camera body. At this point the plunger 16 is not energized, so that the engaging rod 16a is in the protruding state and the magnetic head 10 is separated from the magnetic recording area 2b of the film 2 as shown in FIG. 2 or 4A.

At first a step S1 resets flags H, S, F1, F2 and F3 which will be explained in the following.

The flag H assumes a state 1 or 0 respectively when the magnetic head 10 is in contact with or separated from the magnetic recording area 2b. The flag S assumes a state 1 upon detection of the information indicating the leading end of a set of magnetic information signals. The flag F1 assumes a state 1 upon detection of attachment of the leading end of the film 2 onto the winding spool 5. The flags F2 and F3 will be explained later.

Then a step S2 discriminates, from the state of the cartridge detecting switch 62, whether the cartridge 1 is loaded in the camera. If said switch 62 is off, the absence of cartridge is identified and the sequence remains at the step S2. If said switch 62 is on, the loaded state of cartridge is identified and the sequence proceeds to a step S3. The step S3 discriminates, from the state of the cartridge lid detecting switch 64, whether the cartridge lid is closed. If said switch 64 is off, the cartridge lid is identified as not closed and the sequence returns to the step S2. If the switch 64 is on, the lid is identified closed and the sequence proceeds to a step S4. The step S4 forwards the film 2 from the cartridge 1, according to a subroutine program shown in FIG. 7.

Figure 7:
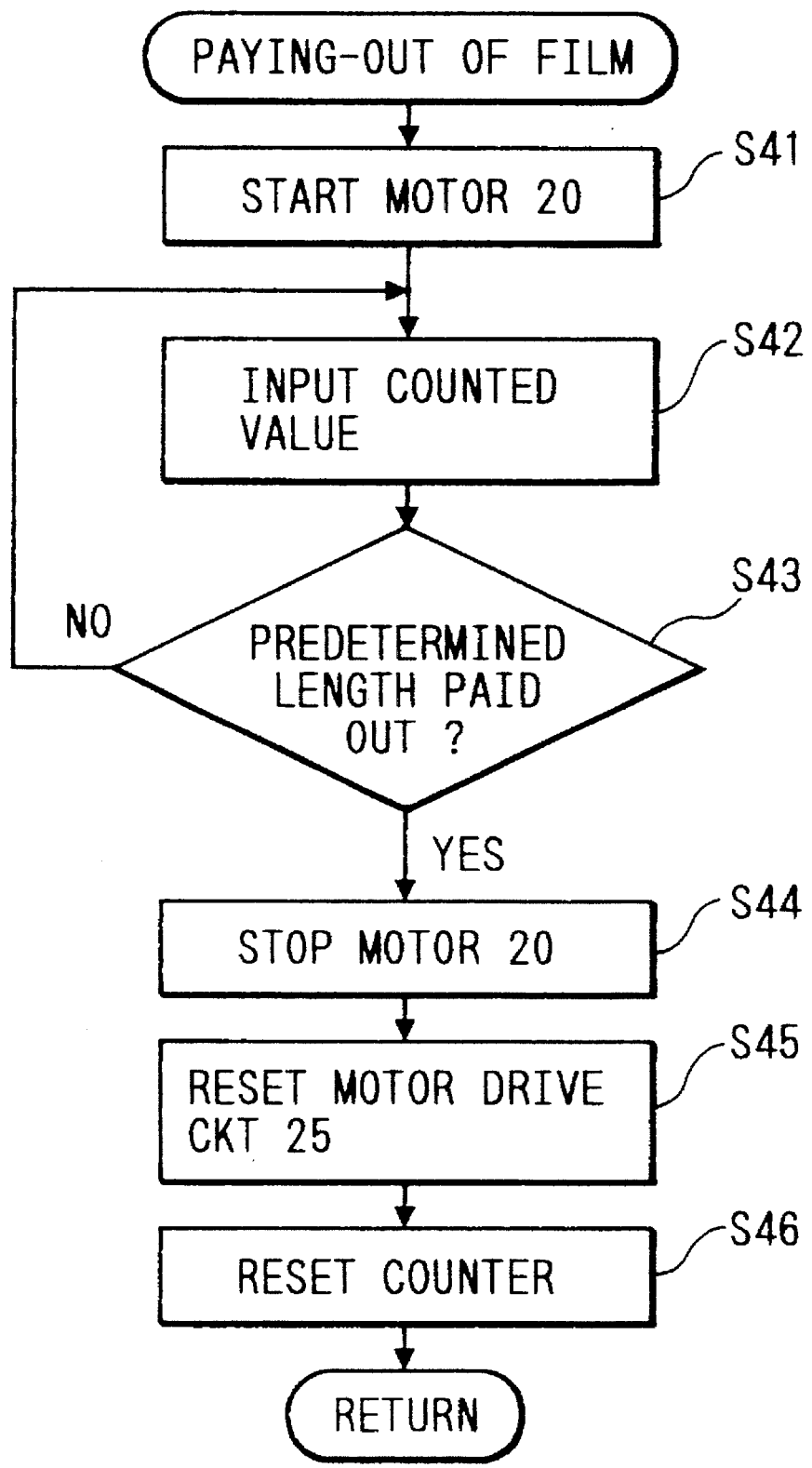

Referring to FIG. 7, a step S41 shifts only the output port 02 to the high level state, thereby rotating the motor 20 in the forward direction through the motor control circuit 15. Thus the spline 1c of the cartridge 1 is rotated in the direction A by the gears 20a, 21 thereby advancing the film 2 from the cartridge 1. Then a step S42 enters the count of the counter 45 (corresponding to the number of perforations detected by the photosensor 40), as the amount of film advancement.

A step S43 discriminates whether the entered amount of film advancement is enough for the leading end of the film 2 to reach the winding spool 5, and, if affirmative or negative, the sequence respective returns to the step S42 or proceeds to a step S44. The step S44 sets the output ports 02 and 03 at the high level state, thereby braking and stopping the motor 20, and, after a time required for secure stopping of the motor, the sequence proceeds to a step S45. The step S45 shifts the output ports 02, 03 both to the low level state thereby resetting the motor control circuit 25. Then a step S46 resets the counter 45 to zero, and the sequence returns to the main flow shown in FIG. 6.

Figure 8:
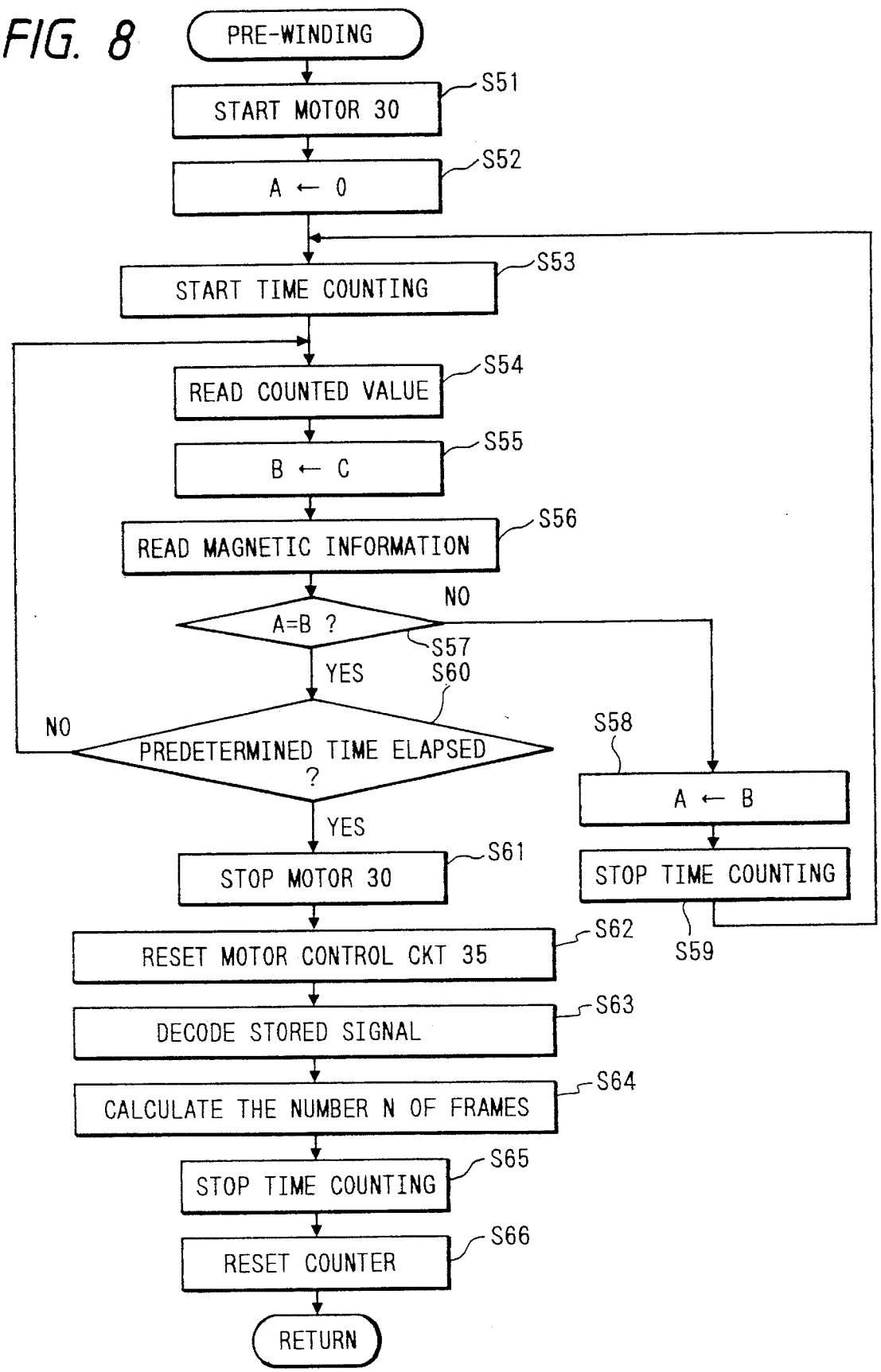

Then a step S5 in FIG. 6 effects the pre-winding operation, according to a subroutine program shown in FIG. 8.

Referring to FIG. 8, a step S51 sets the output port 04 only at the high level state, thereby rotating the motor 30 in the forward direction through the motor control circuit 35. Thus the winding spool 5 is rotated in the direction A by the gears 30a, 6 whereby the film 2 is wound on the winding spool 5. Then a step S52 resets a memory A to zero, then a step S53 starts time counting, a step S54 reads the count C of the counter 45, and a step S55 stores said count C in a memory B.

Then a step S56 effects a process of reading the information (ISO sensitivity, number of image frames, kind of film, latitude etc.) recorded in advance in the magnetic recording area 2b of the film 2, by means of the magnetic head 10. The details of said process are shown in a subroutine program in FIG. 9.

Figure 9:
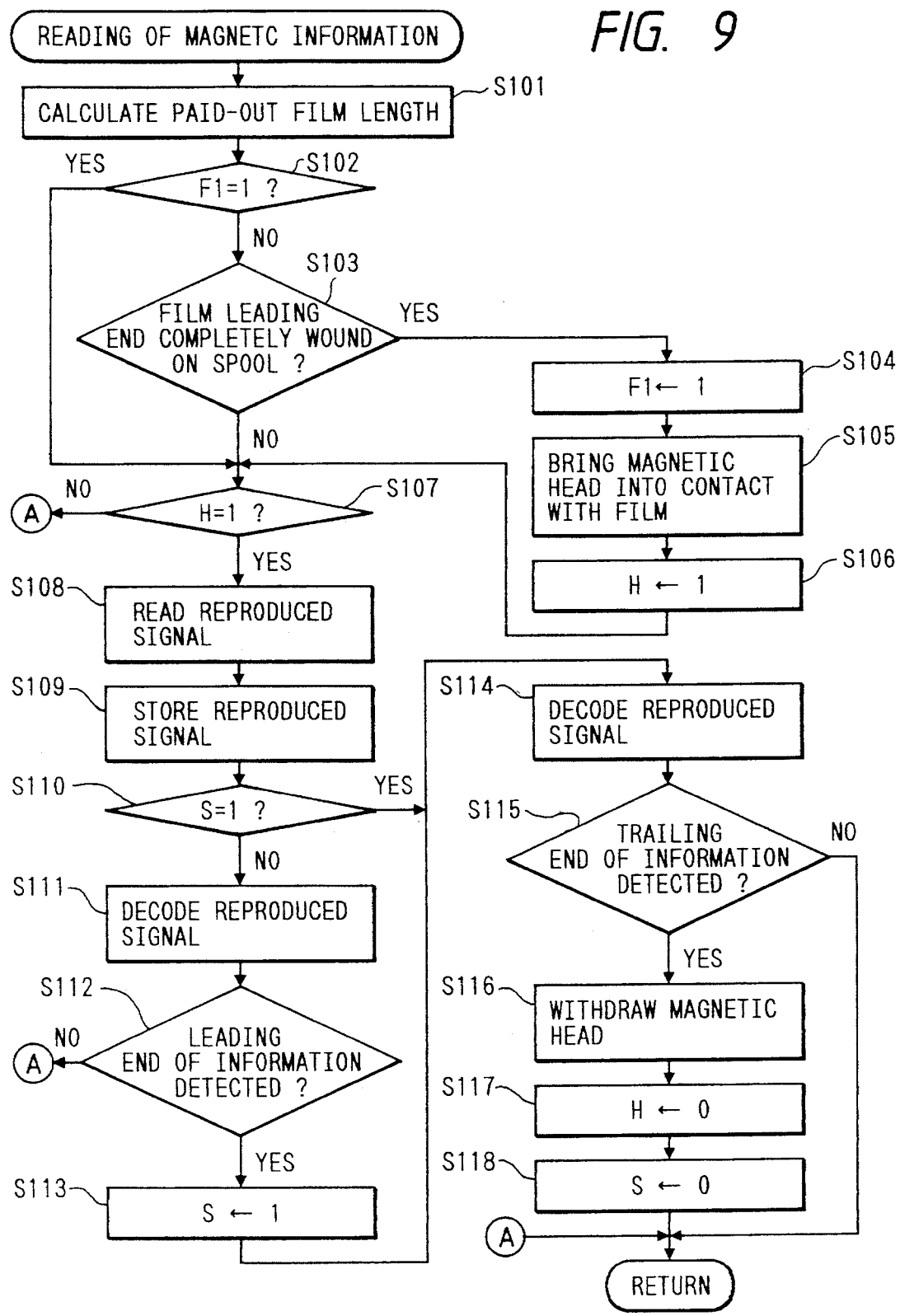

In FIG. 9, a step S101 converts the count C of the counter 45, read in the step S54 in FIG. 8, into the amount of film advancement, then a step S102 discriminates the state of the flag F1, and, if it is 1 or 0, the sequence respectively proceeds to a step S107 or S103.

The step S103 discriminates, from the amount of film advancement obtained in said step S101, whether the leading end of the film 2 is completed wound on the winding spool 5, and, if affirmative or negative, the sequence respectively proceeds to a step S104 or S107. The step S104 sets the flag F1 at "1" indicating the completely wound state, and then a step S105 shifts the output port 01 to the high level state thereby energizing the plunger 16. Thus the engaging rod 16a of the plunger 16 is retracted whereby the support lever 12 rotates anticlockwise by the biasing force of the spring 15 and the magnetic head 10 is pressed to the magnetic recording area 2a of the film 2 as shown in FIG. 3 or 4B. Subsequently, the microcomputer 50 causes the magnetic head driving circuit 18 to drive the magnetic head 10, thereby starting the information reading from the magnetic recording area 2b.

Then a step S106 sets the flag H at "1", and a step S107 discriminates whether the flag is "1", indicating that the magnetic head 10 is in contact with the magnetic record-area 2b. If the flag H is 0 (in case of non-contact), the sequence returns to the sequence shown in FIG. 8. If the flag H is "1" (in case of contact), the sequence proceeds to a step S108 for entering signals reproduced from the magnetic head 10 and amplified in the magnetic head driving circuit 18. Then a step S109 stores said entered signals in a memory.

Then a step S110 discriminates whether the flag S is "1", indicating that the information representing the leading end of a set of magnetically recorded information is already detected, and, if said flag S is "1" (case of detection) or "0" (case of non-detection), the sequence respectively proceeds to a step S114 or S111. The step S111 decodes the entered reproduced signals, and a step S112 discriminates whether the decoded signals contain a signal indicating the leading end of the information. If the discrimination of the step S112 turns out negative or affirmative, the sequence respectively returns to the flow in FIG. 8 or proceeds to a step S113, which sets the flag S at "1", indicating that the leading end of the information has been detected.

Then a step S114 decodes the reproduced signals read in the step S108, and a step S115 discriminates whether thus decoded signals contain information indicating the end of information. If not, the sequence returns to the sequence in FIG. 8, but, if said information is contained, the sequence proceeds to a step S116.

The step S116 shifts the output port 01 to the low level state, thereby deactivating the plunger 16 and retracting the magnetic head 10 from the magnetic recording area 2a as shown in FIG. 2 or 4A. Then a step S117 resets the flag H to zero, then a step S118 resets the flag S to zero and the sequence returns to the sequence in FIG. 8.

A step S57 in FIG. 8 discriminates whether the content of the memory A is equal to that of the memory B, and, if equal, the sequence proceeds to a step S60 but, if not, the sequence proceeds to a step S58. The step S58 sets the content of the memory B in the memory A, then a step S59 terminates the time counting started in the step S53, and the sequence returns to said step S53. Negative discrimination in the step S57 means a change in the count C of the counter 45, namely continued feeding of the film 2, while affirmative discrimination in the step S57 means that the film 2 is stopped.

The step S60 discriminates whether a predetermined time (for example 2 seconds) has elapsed since the start of time counting in the step S53. Affirmative discrimination in the step S60 means that the film has been stopped at least for said predetermined time (2 seconds), and the film is identified to have been wound to the end. Thus a step S61 shifts the output ports 04, 05 both to the high level state, thereby stopping the motor 30 through the motor driving circuit 35. If said predetermined period has not elapsed, the sequence returns to the step S54 to repeat the above-explained sequence.

In the above-explained sequence of the steps S51 to S60, the magnetic head 10 is brought into contact with the magnetic recording area 2b of the film 2 together with the start of pre-winding operation, thereby initiating the leading of the magnetically recorded information. Upon detection of the information indicating the leading end of a set of magnetically recorded information followed by the detection of information indicating the trailing end of said set, meaning the reading of all the set, the magnetic head 10 is retracted from the magnetic recording area 2b. Thereafter the magnetic head 10 is maintained in thus retracted position until the end of the pre-winding operation. Thus the magnetic head is maintained in contact with the magnetic recording area 2b of the film 2 for a period which is shorter than the time required from the start to the end of the pre-winding operation but is enough for reading at least a set of recorded information.

After a time required for secure stopping of the motor subsequent to the step S61, a step S62 shifts the output ports 04, 05 to the low level state, thereby resetting the motor control circuit 35. Then a step S63 decodes the reproduced signals stored in the step S109 in FIG. 9, and a step S64 calculates the total number N of available image frames, from the number of the detected perforations P, namely the count C of the counter 45. Utilizing the number k of perforations per image frame (usually k=8), the total number N of available image frames is given by C/k (fractional part being discarded).

Then a step S65 terminates the time counting started in the step S53, a step S66 resets the count C of the counter 45 to zero, and the sequence returns to the main sequence shown in FIG. 6.

A step S6 in FIG. 6 discriminates, from the state of the shutter release switch 66, whether a shutter releasing operation has been conducted. If said switch 66 is off, the shutter release operation is identified to have not been conducted and the sequence remains at said step S6. If said switch is on, the shutter releasing operation (depression of. the shutter release button for closing the shutter release switch 66) is identified to have been conducted, and the sequence proceeds to a shutter releasing operation in a step S7.

Figure 10:
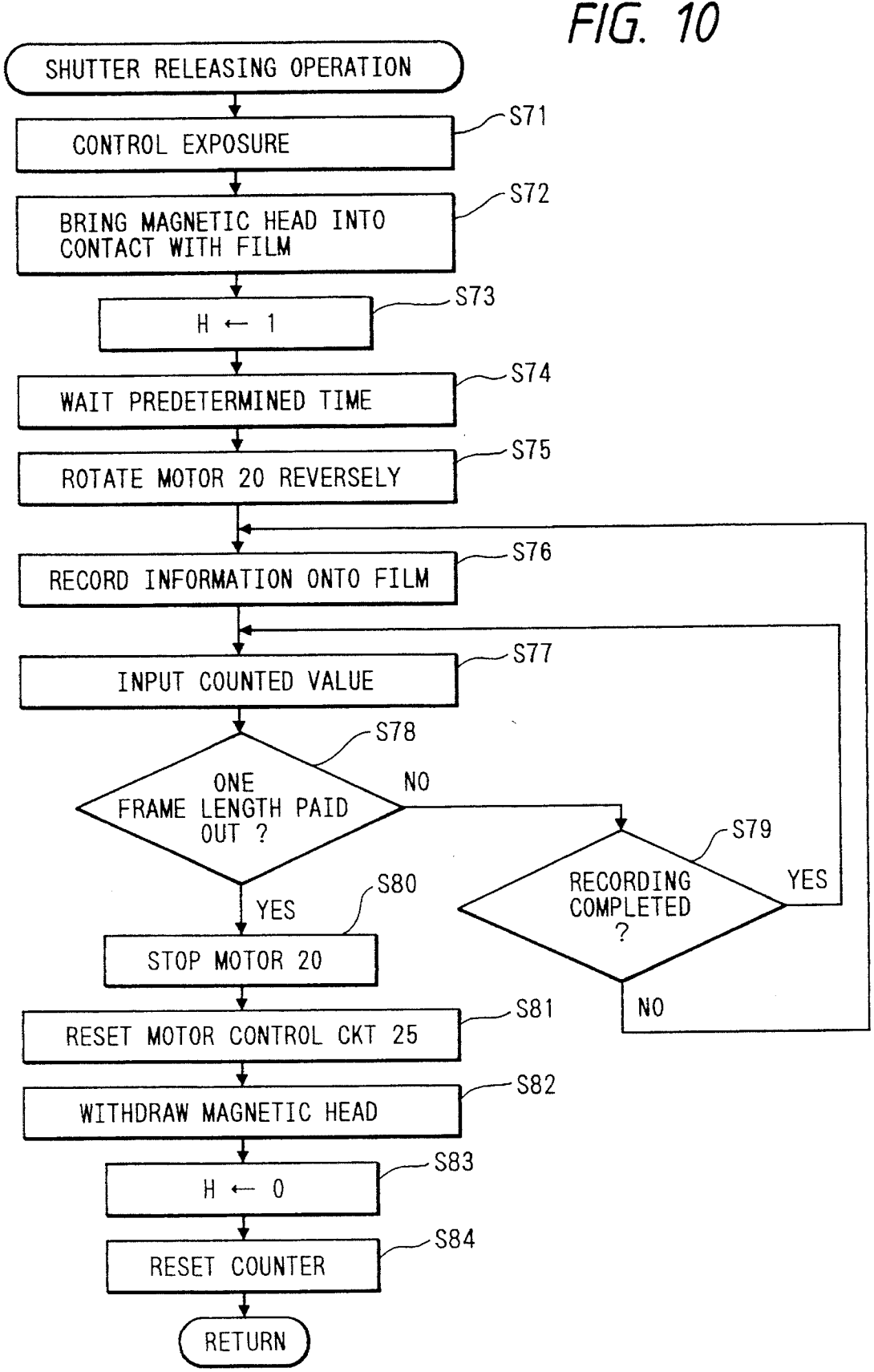

FIG. 10 shows the details of a subroutine program for said shutter releasing sequence. At first a step S71 effects an exposure control operation by calculating the diaphragm aperture and the shutter speed, based on the object brightness detected by an unrepresented light metering device and the ISO sensitivity obtained from the magnetic recording area 2b of the film 2, and driving the diaphragm and the shutter through the exposure control device 54.

Then a step S72 shifts the output port 01 to the high level state thereby energizing the plunger 16 to bring the magnetic head 10 in contact with the magnetic recording area 2b of the film 2 as shown in FIG. 3 or 4B, and a step S73 sets the flag H at 1. Then a step S74 waits for a predetermined period until the magnetic head 10 is stably contacted with the magnetic recording area 2b of the film 2, and a step S75 shifts the output port 03 to the high level state, thereby reversing the motor 20 through the motor control circuit 25 and starting the re-winding of the film 2 into the cartridge 1.

A step S76 effects information recording in the magnetic recording area 2b by the magnetic head 10, through the magnetic head driving circuit 18. Said information is specific to the image frame, such as the date and time of phototaking operation, and information arbitrarily selected by the photographer. The film moving direction at said information recording is opposite to that in the aforementioned pre-winding operation, the information to be recorded has to be inverted as a mirror image in recording, in order to match the aforementioned recording format.

Then a step S77 calculates the amount of advancement of the film 2 by entering the count C of the counter 45, and a step S78 discriminates whether the calculated amount of film advancement corresponds to an image frame. When affirmative or negative, the sequence respectively proceeds to a step S80 or S79. The step S79 discriminates whether the data recording has been completed, and, if completed, the sequence returns to the step S77, but, if not, the sequence returns to the step S76. It is assumed that the time required for said data recording is shorter than the time required for film advancement of an image frame.

The step S80 sets the output ports 02, 03 at the high level state to stop the motor 20 by the motor control circuit 25, and, after a time required for secure stopping of the motor, a step S81 shifts the output ports 02, 03 to the low level state, thereby resetting the motor control circuit 25. Then a step S82 shifts the output port 01 to the low level state, thereby deactivating the plunger 16 and retracting the magnetic head 10 from the magnetic recording area 2b of the film 2.

Subsequently a step S83 resets the flag H to zero, a step S84 resets the counter 45 to zero, and the sequence returns to the main sequence shown in FIG. 6.

A step S8 in FIG. 6 decreases the image frame number N by "1", and a step S9 discriminates whether N=0. If N≠0, the sequence returns to the step S6 to repeat the above-explained sequence. If N=0, indicating that all the image frames have been exposed and rewound, the sequence proceeds to a step S10 for rewinding the leading end of the film 2 into the cartridge 1.

Figure 11:
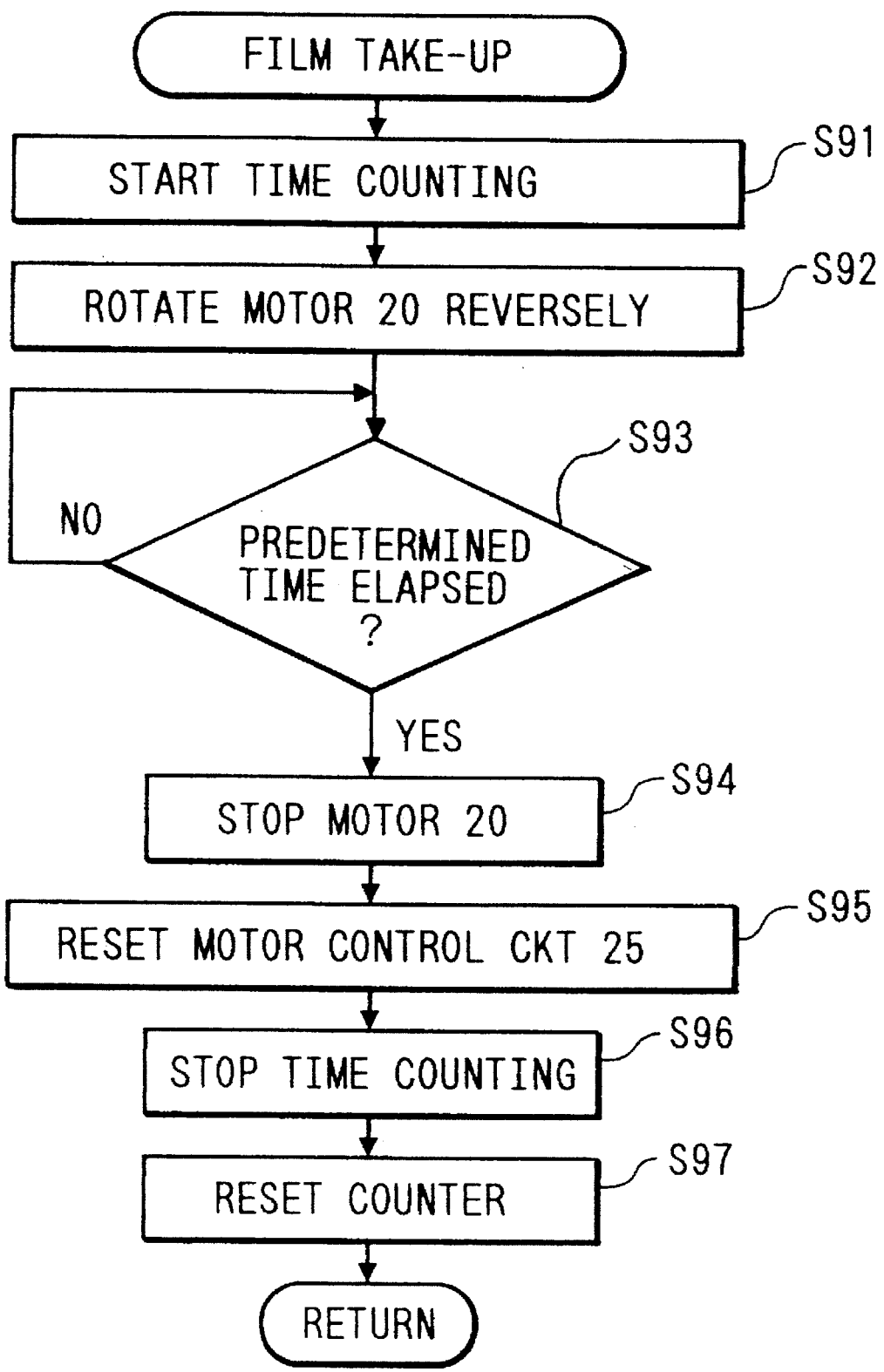

FIG. 11 shows a subroutine sequence of the details of said rewinding operation. At first a step S91 starts time counting, and a step S92 shifts the output port 03 to the high level state to reverse the rotation of the motor 20, whereby the film 2 is rewound into the cartridge 1. A step S93 discriminates the lapse of a predetermined time, required for complete rewinding of the film 2 into the cartridge 1, from the start of time counting, and the sequence remains at the step S93 if said time has not elapsed but it proceeds to a step S94 if said time has elapsed.

The step S94 shifts the output ports 02, 03 to the high level state to stop the motor 20, and after a time required for secure stopping of the motor, a step S95 shifts the output ports 02, 03 to the low level state to reset the motor control circuit 25. Then a step S96 terminates the time counting, a step S97 resets the counter 45 to zero, and the sequence returns to the main sequence shown in FIG. 6.

A step S11 in FIG. 6 discriminates, from the state of the cartridge lid detecting switch 64, whether the cartridge lid is closed, and, if closed the sequence remains at the step S11, but, if opened, the sequence proceeds to a step S12, which discriminates, from the state of the cartridge detecting switch 62, whether the cartridge 1 is taken out. If not taken out, the sequence returns to the step S11, but, if taken out, it returns to the step S1.

The sequence from the loading of the cartridge 1 to the taking out thereof is controlled by the microcomputer 50 as explained in the foregoing.

In the above-explained embodiment, the motors 20, 30 constitute film feeding means, while the plunger 16 constitutes the contact/separating means, and the microcomputer 50 constitutes the control means.

Figure 12:
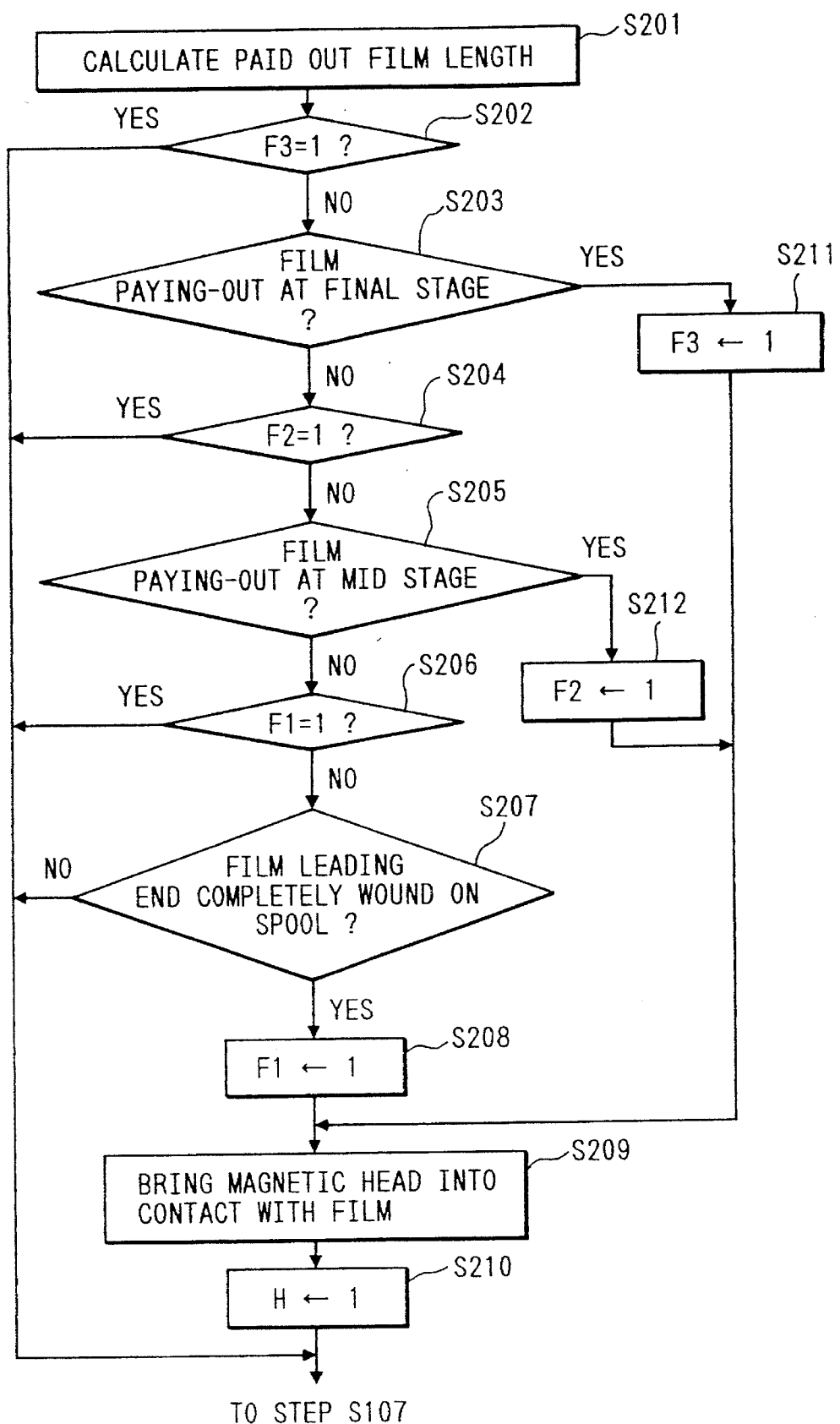
FIG. 12 is a flow chart of another embodiment.

In the following there will be explained another embodiment, which is same as the foregoing embodiment except that the steps S101–S106 in FIG. 9 are modified as shown in FIG. 12.

Referring to FIG. 12, a step S201 calculates the amount of film advancement from the count C of the counter 45, read in the step S54 in FIG. 8, then a step S202 discriminates whether a flag F3 is "1", and, if "1", the sequence proceeds to the step S107 in FIG. 9 but if "0", a step S203 discriminates, from said amount of film advancement, whether the film feeding has entered a final period. In the present embodiment, the film feeding in the prewinding operation is divided into initial, intermediate and final periods. For example, in case of a film with 36 image frames, the film feeding up to the 15th frame is classified as initial period; that from the 16th to 30th frame is classified as intermediate period; and that thereafter is classified as final period.

If the step S203 identifies that the film feeding is in the final period, a step S211 sets the flag F3 at "1" and the sequence proceeds to a step S209, but, if the film feeding is identified as not yet in the final period, the sequence proceeds to a step S204. The step S204 discriminates whether a flag F2 is "1", and, if "1", the sequence proceeds to the step S107 in FIG. 9, but, if not "1", a step S205 discriminates whether the film feeding has entered the intermediate period, based on the amount of film advancement. If affirmative, a step S212 sets the flag F2 at "1" and the sequence proceeds to a step S209, but, if negative, the sequence proceeds to a step S206.

The step S206 discriminates whether the flag F1 is "1", and, when it is "1" or not, the sequence respectively proceeds to the step S107 in FIG. 9 or to a step S207. The step S207 discriminates whether the leading end of the film 2 has completely wound on the winding spool 5, and, if not, the sequence proceeds to the step S107 in FIG. 9, but, if wound, a step S208 sets the flag F1 at "1" and the sequence then proceeds to a step S209.

The step S209 brings the magnetic head 10 in contact with the magnetic recording area 2b of the film 2, then a step S210 sets the flag H at "1", and the sequence then proceeds to the step S107.

According to the above-explained sequence, in the pre-winding operation, the magnetic head is brought into contact with the magnetic recording area 2b to read a set of information, once in each of the initial, intermediate and final periods of film feeding, and said magnetic head is separated from said recording area 2b in other periods. It is therefore possible to suppress the abrasion of the magnetic head 10 as in the foregoing embodiment, and the information reading is conducted in securer manner because it is repeated three times.

FIGS. 13 to 17 show various modifications of the sequence shown in FIG. 12.

Figure 13:
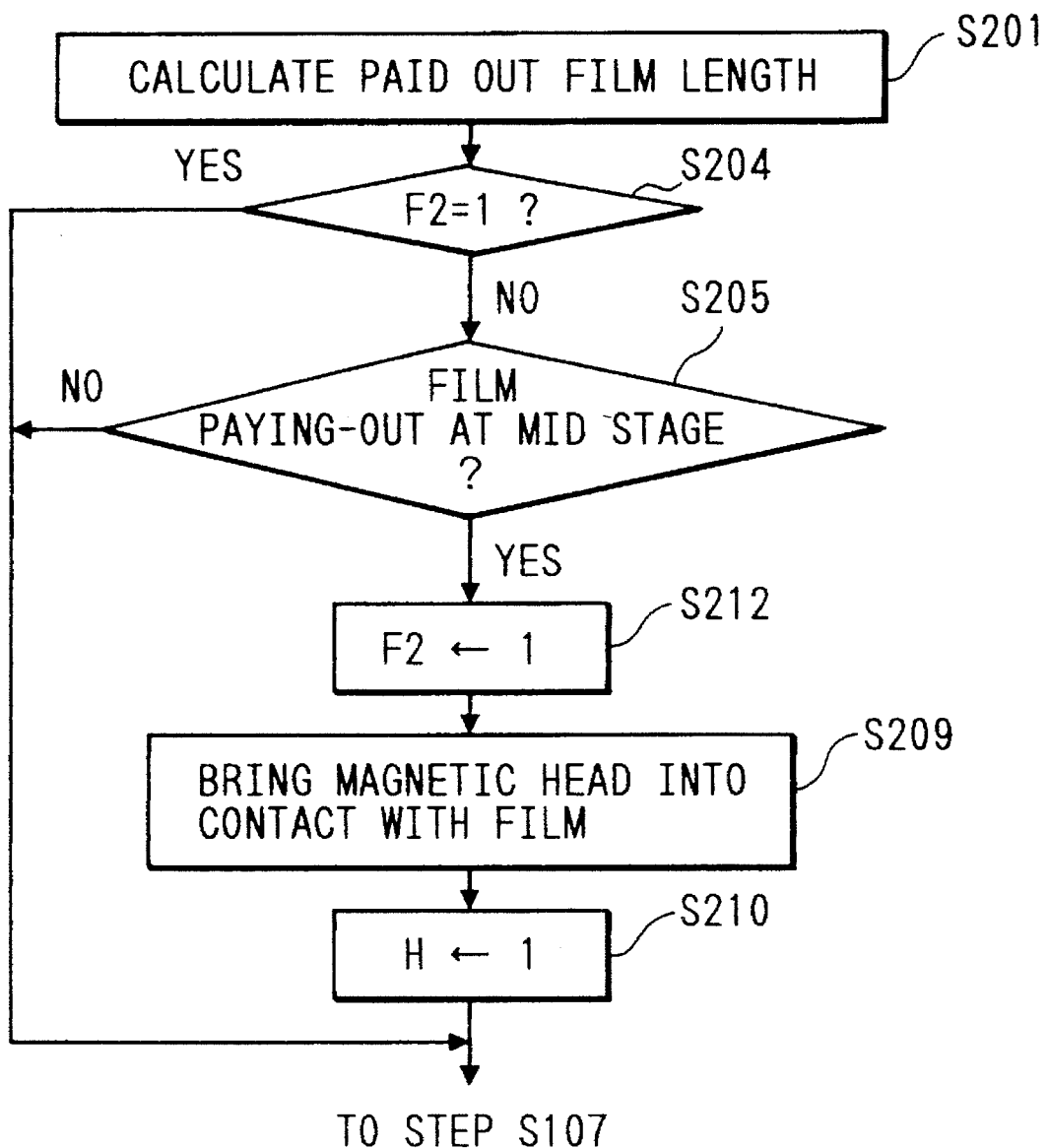
Figure 14:
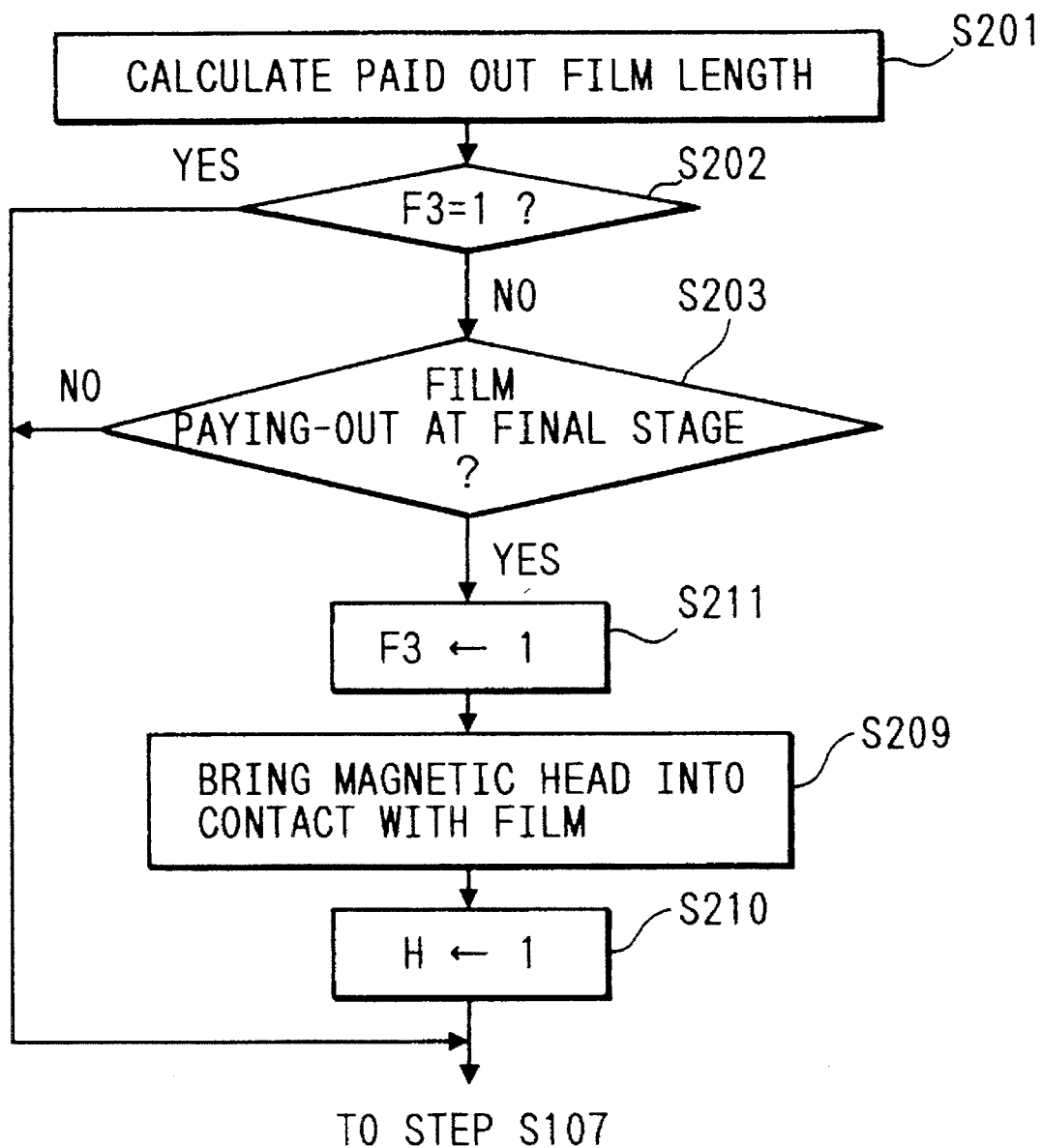
Figure 15:
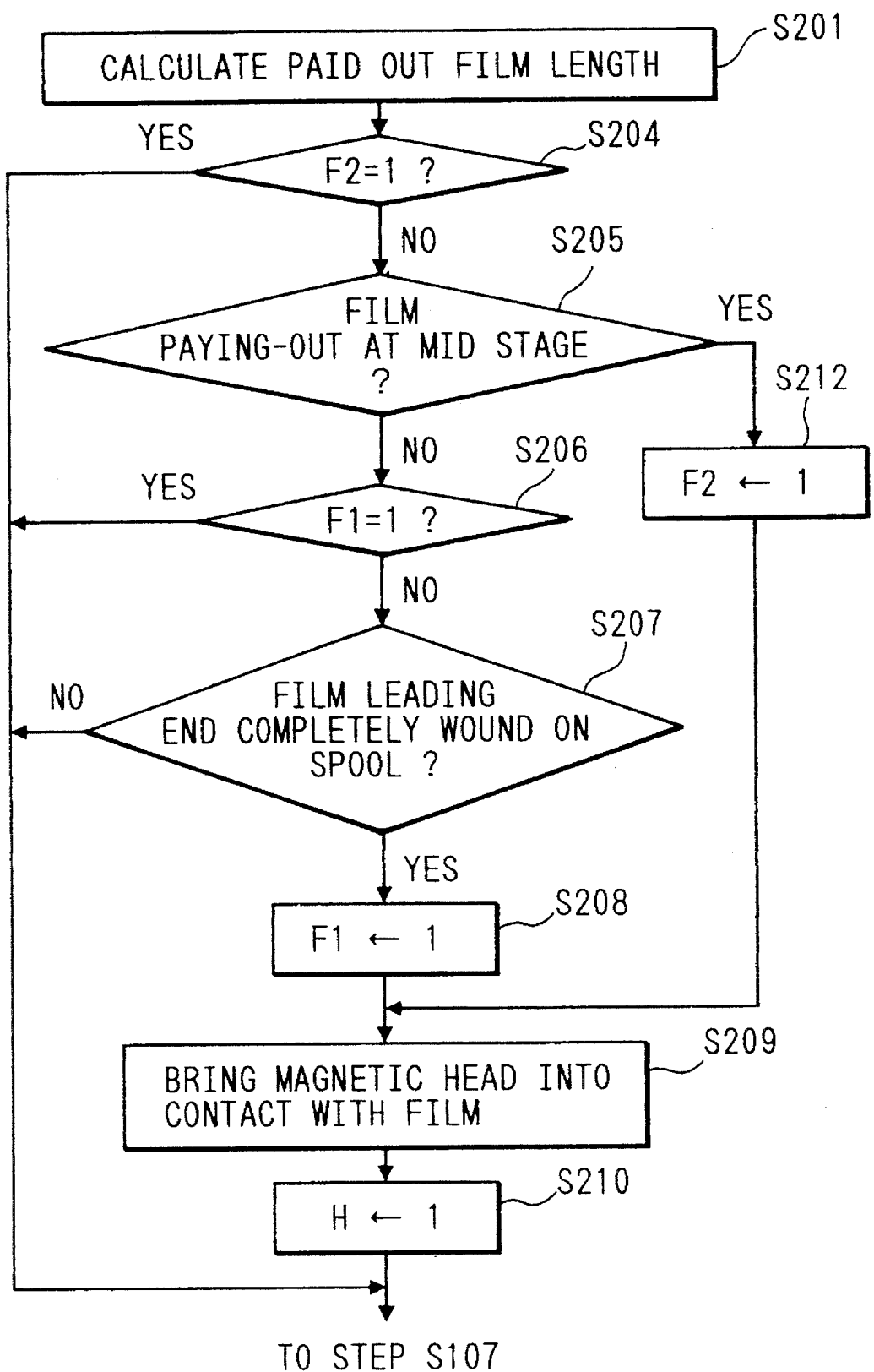
Figure 16:
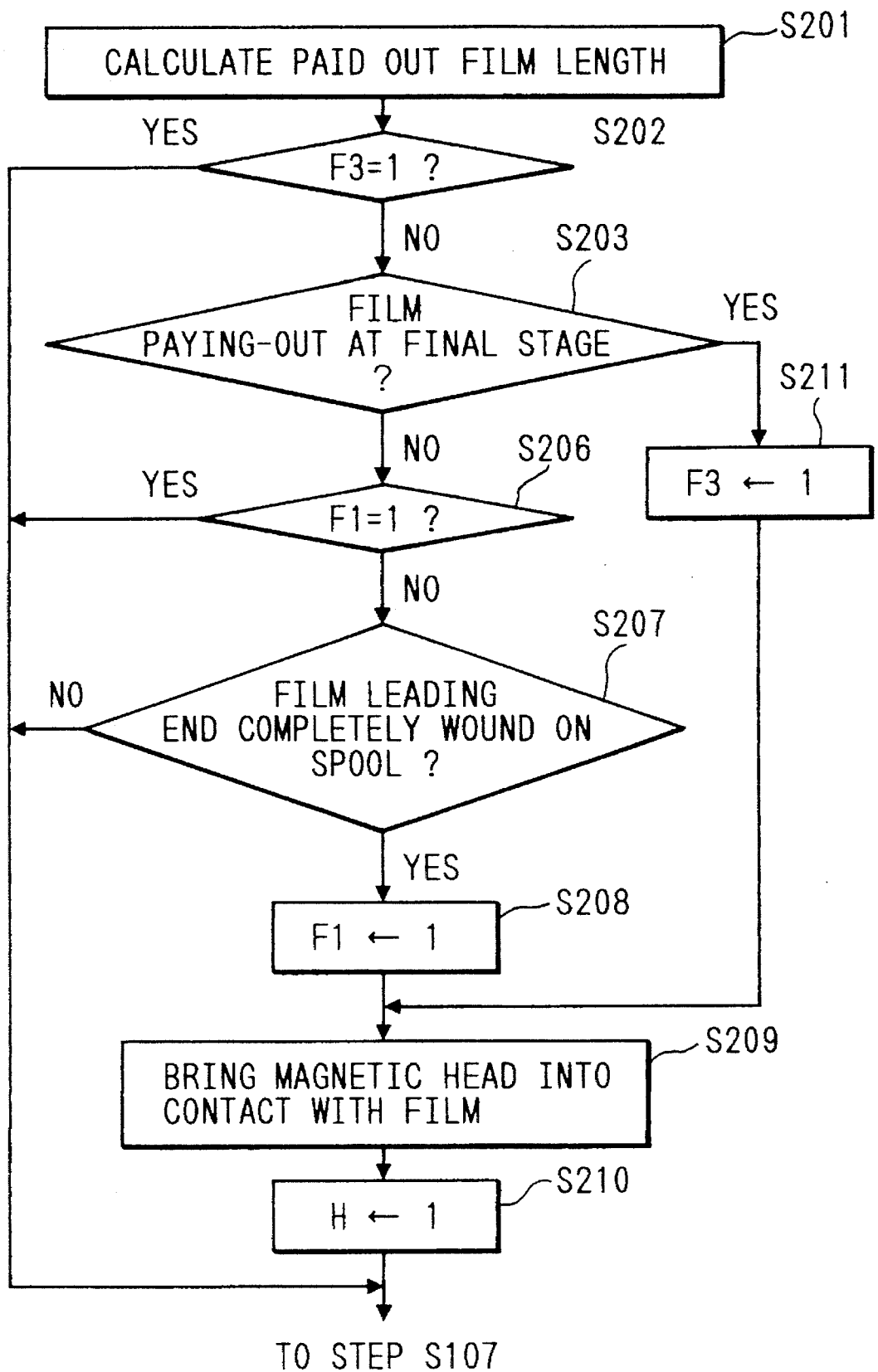

The sequence in FIG. 13 effects the contact of the magnetic head 10 with the magnetic recording area 2b and the reading of a set of information, only in the intermediate period of the film feeding. That in FIG. 14 similarly effects the reading of a set of information only in the final period of the film feeding. That in FIG. 15 effects said information reading once in each of the initial and intermediate periods of the film feeding. That in FIG. 16 effects the reading of a set of information in each of the initial and final periods of the film feeding, and that in FIG. 17 effects said reading in each of the intermediate and final periods of film feeding.

In the foregoing embodiments, the film is forwarded by rotating the spool shaft of the cartridge by a motor, then is automatically wound on the winding spool and taken up thereon, but the present invention is likewise applicable to an ordinary cartridge in which the leading end portion of the film is manually extracted and attached to the winding spool for film winding. Also the magnetic recording area, positioned below the image recording area in the foregoing embodiments, may be positioned above said image recording areas. Furthermore the magnetic recording area may be provided corresponding to each image recording frame, or irrelevant therefrom. Also the information recorded in the magnetic recording area is not limited to that described in the foregoing embodiments. Furthermore, the perforations enable to detect the amount of film advancement if at least one perforation is present in each image recording area. Furthermore the contact/separating means of the magnetic head is not limited to that in the foregoing embodiments, and the magnetic head may be only capable of information reading.

As explained in the foregoing, the present invention allows to minimize the abrasion of the magnetic head thereby significantly extending the service life thereof without any lack in the necessary information, since, in the pre-winding operation, the magnetic head is maintained in contact with the magnetic recording area of the film for a period which is shorter than the time required from the start to the end of said prewinding operation but is enough for reading a set of information recorded in said magnetic recording area.

What is claimed is:

1. A camera capable of loading a cartridge housing a film which is provided with image recording areas and a magnetic recording area in which plural sets of same magnetically recorded information are consecutively recorded along the longitudinal direction, comprising:

film feeding means for effecting a pre-winding operation which winds up all the unexposed frame area a loaded cartridge from the cartridge prior to a phototaking operation and for effecting a rewinding operation which rewinds the film by a predetermined amount into said cartridge in response to a phototaking operation after said pre-winding operation;

a magnetic head capable of being contacted with or separated from said magnetic recording area of said film and of reading said magnetically recorded information in the contacted state;

contact/separating means for contacting or separating said magnetic head with or from the magnetic recording area of said film; and control means for controlling said contact/separating means so as to contact, in said pre-winding operation, said magnetic head with the magnetic recording area of said film for a predetermined period which is shorter than the time required from the start to the end of said pre-winding operation but is enough for reading at least a set of recorded information.

2. A camera according to claim 1, wherein said control means is adapted to so control said contact/separating means as to contact said magnetic head with the magentic recording area of said film in an initial, intermediate or final stage of said pre-winding operation.

3. A camera according to claim 1, wherein said control means is adapted to so control said contact/separating means as to contact said magnetic head with the magnetic recording area of said film in initial and intermediate stages of said pre-winding operation.

4. A camera accoridng to claim 1, wherein said control means is adapted to so control said contact/separating means as to contact said magnetic head with the magnetic recording area of said film in initial and final stages of said pre-winding operation.

5. A camera according to claim 1, wherein said control means is adapted to so control said contact/separating means as to contact said magnetic head with the magnetic recording area of said film in intermediate and final stages of said pre-winding operation.

6. A camera according to claim 1, wherein said control means is adapted to so control said contact/separating means as to contact said magnetic head with the magnetic recording area of said film in initial, intermediate and final stages of said pre-winding operation.

7. A camera capable of loading a cartridge housing a film which is provided with image recording areas and a magnetic recording area in which plural sets of magnetically recorded information are recorded along the longitudinal direction, comprising:

film feeding means for effecting a pre-winding operation which winds up all the unexposed frame area in a loaded cartridge from the cartridge prior to a phototaking operation and for effecting a rewinding operation which rewinds the film by a predetermined amount into said cartridge in response to a phototaking operation after said pre-winding operation;

information reading means including a magnetic head and having a first state for reading said magnetically recorded information from said magnetic recording area of said film and a second state for not reading said magnetically recorded information from said magnetic recording area;

means for changing said information reading means between said first state and said second state; and control means for controlling said changing means so that, in said pre-winding operation, said information reading means is at said first state for a predetermined period which is shorter than the time required from the start to the end of said pre-winding operation but is sufficient for reading at least a set of magnetically recorded information.

8. A camera according to claim 7, wherein, in said first state, said magnetic head is in contact with the magnetic recording area of said film, and in said second state, said magnetic head is retracted from the magnetic recording area of said film.

9. A camera according to claim 8, wherein said changing means has means for displacing said magnetic head.

10. A camera according to claim 7, wherein said control means is adapted to so control said changing means as to keep said information reading means at said first state in an initial, intermediate or final stage of said pre-winding operation.

11. A camera according to claim 7, wherein said control means is adapted to so control said changing means as to keep said information reading means at said first state in initial and intermediate stages of said pre-winding operation.

12. A camera according to claim 7, wherein said control means is adapted to so control said changing means as to keep said information reading means at said first state in initial and final stages of said pre-winding operation.

13. A camera according to claim 7, wherein said control means is adapted to so control said changing means as to keep said information reading means at said first state in intermediate and final stages of said pre-winding operation.

14. A camera according to claim 7, wherein said control means is adapted to so control said changing means as to keep said information reading means at said first state in initial, intermediate and final stages of said pre-winding operation.

15. A method for controlling a camera which has a magnetic head and is capable of loading a cartridge housing a film which is provided with image recording areas and a magnetic recording area in which plural sets of same magnetically recorded information are consecutively recorded along the longitudinal direction comprising:

affecting a pre-winding operation which winds up all the unexposed frame area in a loaded cartridge from the cartridge prior to a phototaking operation; and contacting, in said pre-winding operation, said magnetic head with the magnetic recording area of said film for a predetermined period which is shorter than the time required from the start to the end of said pre-winding operation but is enough for reading at least a set of recorded information.

16. A method for controlling a camera which has a magnetic head and is capable of loading a cartridge housing a film which is provided with image recording areas and a magnetic recording area in which plural sets of magnetically recorded information are recorded along the longitudinal direction, comprising:

effecting a pre-winding operation which winds up all the unexposed frame area in a loaded cartridge from the cartridge prior to a phototaking operation;

changing said magnetic head between a first state for reading said information from said magnetic recording area and a second state for not reading said information from said magnetic recording area; and holding, in said pre-winding operation, said magnetic head at said first state for a predetermined period which is shorter than the time required from the start to the end of said pre-winding operation but is enough for reading at least a set of recorded information.

* * * * *